United States Patent [19]

Willinger

[11] 4,265,751
[45] May 5, 1981

[54] EXTERNAL BIOLOGICAL AQUARIUM FILTER

[75] Inventor: Allan H. Willinger, New York, N.Y.

[73] Assignee: Willinger Bros., Inc., Englewood, N.J.

[21] Appl. No.: 77,660

[22] Filed: Sep. 21, 1979

[51] Int. Cl.³ ............................................. B01D 35/02
[52] U.S. Cl. .................................. 210/169; 210/232; 210/451; 210/416.2
[58] Field of Search ................. 210/169, 416 AS, 451, 210/232; 119/383

[56] References Cited

U.S. PATENT DOCUMENTS

| | | | |
|---|---|---|---|
| 2,729,337 | 1/1956 | Alferman | 210/169 X |
| 2,935,199 | 5/1960 | Willinger | 210/169 |
| 3,321,082 | 5/1967 | Willinger | 210/169 |
| 3,324,829 | 6/1967 | De Jose et al. | 210/169 X |
| 3,441,145 | 4/1969 | Pearson | 210/451 X |
| 3,485,373 | 12/1969 | Powers | 210/169 |
| 3,554,375 | 1/1971 | Willinger | 210/169 |
| 3,785,494 | 1/1974 | Sama | 210/169 |
| 3,835,813 | 9/1974 | Katz | 210/169 X |
| 4,039,448 | 8/1977 | Etani | 210/169 X |
| 4,067,809 | 1/1978 | Kato | 210/169 |

*Primary Examiner*—John Adee
*Attorney, Agent, or Firm*—Friedman, Goodman & Teitelbaum

[57] ABSTRACT

An external aquarium filter is disclosed, the filter including a filter receptacle having a filter chamber for receiving contaminated aquarium water and having a clean water chamber. The two chambers are separated by a filter bed, with the clean water chamber being located above the filter chamber, whereby the flow of water is upwardly through the filter bed. A siphon input tube supplies the aquarium water to the filter chamber, and an output conduit supplies the clean water from the clean water chamber back to the aquarium tank. A commercially available aquarium air pump provides compressed air into the output conduit in order to airlift the clean water from the siphon level into the aquarium tank. The filter bed can include a layer of open cell reticulated foam plastic material, such as polyurethane foam, and a layer of activated carbon.

9 Claims, 7 Drawing Figures

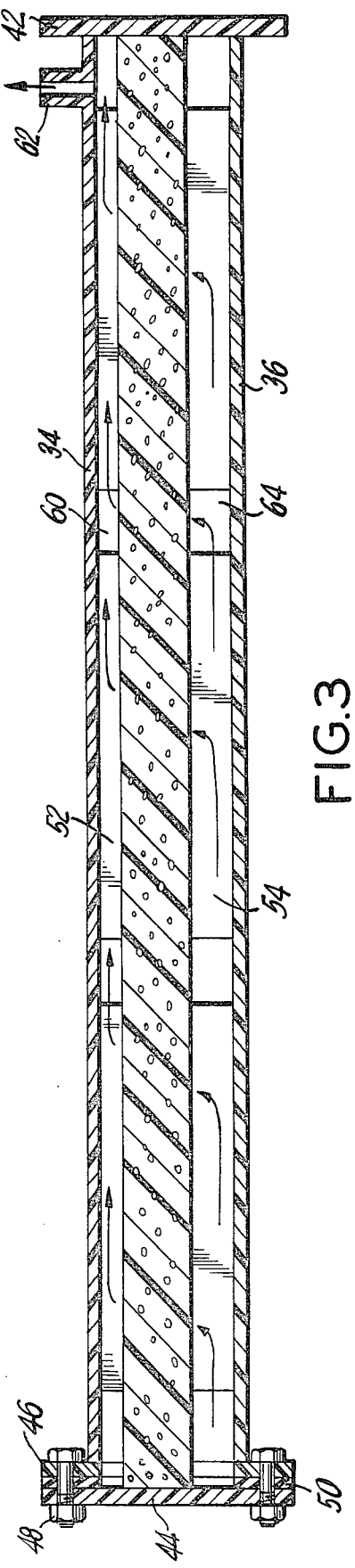
FIG.3
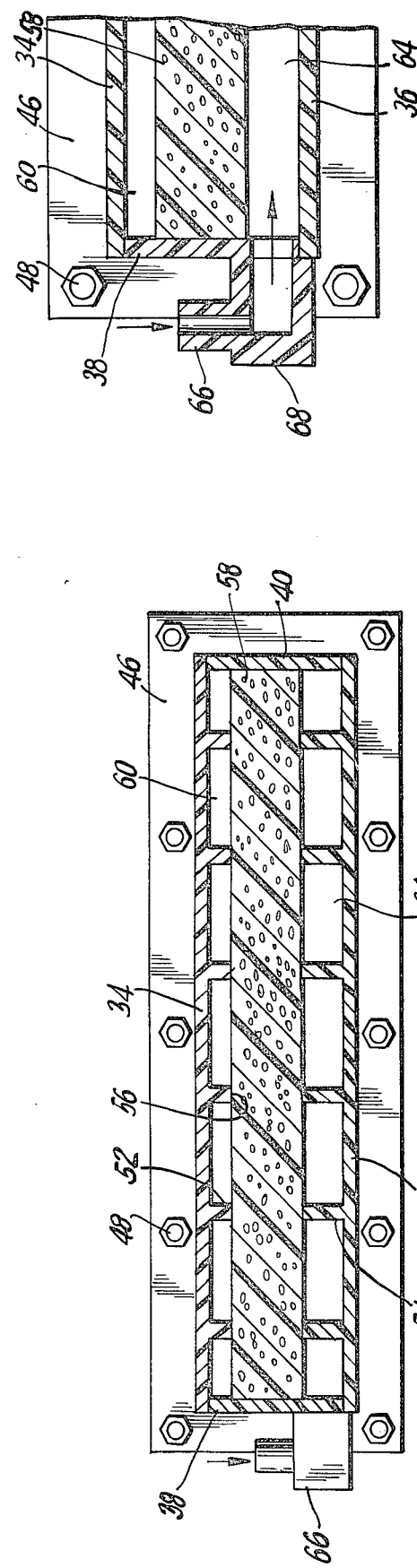
FIG.5
FIG.4

EXTERNAL BIOLOGICAL AQUARIUM FILTER

BACKGROUND OF THE INVENTION

This invention relates to aquarium filters, and more particularly to an external aquarium filter providing biological, mechanical and chemical filtration which can be positioned under the aquarium tank.

It is generally understood that the proper maintenance of an aquarium requires continuous water filtration, preferably of three types as follows: (1) mechanical filtration, which removes suspended solid material from the water, (2) chemical filtration, which removes dyes and other colorants as well as certain inorganic substances, and (3) biological filtration, which removes certain organic waste products by means of naturally occurring bacteria living attached to the filter material. It is clear that biological filtration is most effective if a large surface area for bacteria attachment is provided in the filter.

Typical aquarium filtration devices include a housing containing filter material through which the contaminated aquarium water passes into a clean water chamber. A siphon is generally utilized for extracting the contaminated water from the aquarium tank and supplying it to the filter. The clean water is then either pumped or airlifted back into the aquarium tank thereby providing a continuous flow of water through the aquarium filtration device and providing both clean water to the aquarium tank as well as providing the necessary aeration needed into the tank.

Such external aquarium filters are usually hung over the edge of the aquarium tank and depend therefrom.

The type of filter material utilized in the external aquarium filters generally includes a layer of charcoal with an additional layer of glass wool or polyester fibers placed above the charcoal.

While these filters generally provide sufficient mechanical and chemical filtration, they do not provide adequate biological filtration. The surfce area of the filter material is much too small to support the large bacteria population needed to successfully convert dissolved organic waste products into harmless substances. Furthermore, these filters clog rapidly and need to be changed regularly. Since all filter material is discarded at each change, the small bacteria population which had become established and would have removed at least some of the accumulating dissolved waste products, is discarded as well.

By way of example, two such external aquarium filters are described in my U.S. Pat. Nos. 3,312,082 and 3,554,375.

Although the use of the polyurethane foam as a filter material in the external aquarium filter has been suggested, this type of device still has numerous problems. For example, as the contaminated water flows downwardly through the filter material, the debris will settle over the filter material and cause clogging. This will especially become a problem when utilizing the polyurethane foam. The larger particles of detritus and food flowing with the contaminated water will clog the pores of the foam to completely impair the functioning of the filter. Upon necessary thorough cleaning thereof, the whole bacteria population will be lost.

Another type of aquarium filter is the undergravel type of filter. This device includes a perforated tray spaced from the bottom of the aquarium tank on which is suspended a layer of gravel about ½" above the bottom of the aquarium floor. The contaminated aquarium water passes through the gravel, which serves as the filter bed, and proceeds through the perforations in the tray. The filtered water is then airlifted back into the aquarium proper.

Within the gravel, the water is filtered mechanically. However, the efficiency of this process depends upon the size of the gravel grains, the depth of the filter bed, and the flow rate of the water. In addition to the mechanical filtering actions, the undergravel filter serves as a biological filter. Certain species of aerobic bacteria, which grow attached to the gravel grains and to particles of detritus, convert potentially toxic by-products of fish metabolism into non-harmful products.

For example, ammonia and nitrite, which are potentially toxic by-products of fish metabolism, are converted into nitrate and nitrogen. These latter chemicals which even in high concentrations are non-toxic to fish, can be used either by the plants, as in the case of nitrate, or else can escape through the surface of the water directly into the air, as in the case of nitrogen.

Numerous types of such undergravel filter devices are readily available. For example, U.S. Pat. No. 2,935,199, issued to the present inventor, describes one such undergravel filter. Numerous other types are clearly available.

The undergravel filters have been well accepted by hobbyists and, if properly installed and maintained, serve a very important function in the aquarium. However, there are a number of drawbacks to these filters which require the hobbyist to adhere to strict precautionary measures. They also place restrictions upon the use of decorative materials and plants in the aquarium.

For example, for greatest efficiency of flow, the diameter of the gravel grains should be of a size from about 2 to 5 mm. The particles should also be irregularly shaped, without being smooth and round, in order to achieve the greatest possible surface area for filtration. However, this type of gravel is not always available to the user, or it might not fit his decorative scheme.

In order to achieve an even flow of the water through the gravel filter bed, the gravel should be placed in an even uniform layer. Any mound building should be avoided since the water will find the least resistant passage through the gravel and will therefore not flow through the heaped up gravel portions. At the same time, the optimal thickness of the filter bed should be about 2 to 3 inches. Either more or less amount of gravel decreases proper functioning of the filter bed.

Additionally, the contents of the aquarium tank itself often disturb the gravel filter bed. For example, certain types of fish can dig depressions into the bed, often down to the filter plate, thereby rendering the filtration system useless. Additionally, it has been found that aquatic plants do not flourish in aquariums using undergravel filters. Although the reason for this is not quite clear, it may be that a biological imbalance occurs within the gravel bed, or that the water flowing past the roots disturbs the growth of the plants. Furthermore, rocks or other decorations placed on the gravel bed will interfer with the even water flow causing dead spots in the filter bed. Similarly, terracing of the gravel bed destroys the uniformity of depth thereby decreasing the filtering action.

The underground filters maintained within the aquarium tank also provide additional problems. Oftentimes, especially with beginning hobbyists, the fish will be overfed. This causes the uneaten food particles to clog the interstices between the gravel grains, thereby overloading the capability of the filter bed to convert organic matter. Removal of the accumulated food particles as well as accumulations of detritus to unclog a filter bed requires additional filtering apparatus.

Such accumulations occur not only in the case of food particles, but even during continuous filtration. Since the water flows down through the gravel, heavy sediment collects on top of the gravel layer which causes the filter bed to become partially clogged. Channels will form in places of least resistance in the filter bed, for example, where the coarser grains provide large interstices. This will drastically reduce the effective filtering area. Ultimately, the filter bed will become completely clogged, necessitating a thorough washing of the gravel, or even a complete breakdown of the aquarium.

In using the undergravel filter, the airlift brings the aerated water within the aquarium tank. Accordingly, it is very difficult to determine the flow rate through the airlift tube especially when the tubes are at least partially submerged in water. Although air bubbles may be seen rising in the tube, water may not be flowing if the gravel bed is clogged. The air stream continues to work but the water may not be circulating. Since it may go unnoticed that filtration has ceased in the aquarium, a dangerous buildup of toxic waste products may occur.

In using the undergravel filter, there is no practical means of utilizing activated carbon for providing chemical filtration in the system without seriously impairing the flow.

Perhaps the most critical problem in connection with undergravel filters is that they require the use of gravel in the aquarium tank since the gravel forms the filter bed. Breeders of aquarium fishes and wholesale establishments often use no gravel at all. As a result, they cannot make efficient use of this type of biological filtration.

In order to achieve the effect of a biological filter, without utilizing the undergravel type filter, it has been suggested to utilize a polyurethane sponge instead of gravel on the bottom of the aquarium. This approach has been suggested by Art Hayley, in an article, "The Biological Sponge" published in Freshwater and Marine Aquarium Magazine, January, 1978, Vol. 1, Number 1, pages 33–37 and 81.

While the sponge would harbor a sizable population of bacteria, the problems of clogging and consequent cleaning without disturbing the biological filtering capacity still exist.

In summary, although both the conventional external filter and the undergravel filter perform important functions in the aquarium, neither can combine mechanical, chemical and biological filtration into one filter.

SUMMARY OF THE INVENTION

It is accordingly an object of the present invention to provide an improved aquarium filter which avoids the aforementioned problems of prior art devices.

Yet another object of the present invention is to provide an improved external aquarium filter which provides unique benefits over and above those previously utilized in the prior art.

Still another object of the present invention is to provide an external aquarium filter which has the clean water chamber above the filtering chamber, whereby an upward flow of water is provided through the filter bed.

Yet an additional object of the present invention is to provide an external aquarium filter which provides filtering from the bottom upwards through the filter bed, thereby providing for a settling chamber beneath the filter bed where larger particles of contaminants can be collected.

Another object of the present invention is to provide an external aquarium filter which can be easily backflushed to remove accumulated sediment, without disturbing the filter bed.

A further object of the present invention is to provide an external aquarium filter wherein the accumulated contaminants from the aquarium water do not clog the filter bed.

Yet another object of the present invention is to provide an external aquarium filter which provides the features of a biological filter.

Still another object of the present invention is to provide an external aquarium filter which can be placed under the aquarium tank.

A further object of the present invention is to provide an external aquarium filter having a siphon input, a conduit output, and utilizing an air pump for raising the clean water above the siphon level and back into the aquarium tank.

An added object of the present invention is to provide an external aquarium filter having a filter bed including a layer of open cell reticulated foam plastic material, such as polyurethane foam, and a layer of activated carbon.

Briefly, in accordance with an aspect of the present invention, there is provided an external aquarium filter assembly having a filter receptacle which includes a filter chamber for receiving contaminated aquarium water, and a clean water chamber. These two chambers are separated by a filter bed. The clean water chamber is located above the filter chamber whereby the flow of water is upwardly through the filter bed. An input means supplies the contaminated aquarium water to the filter chamber, and an output means supplies the clean water from the clean water chamber back to the aquarium tank.

In an embodiment of the invention, the input means utilizes a siphon tube which provides a siphoned flow of water from the aquarium tank. The output means includes a conduit coupling the clean water chamber to the aquarium tank, where an aquarium air pump supplies compressed air into the conduit at a vertical height lower than the water level in the aquarium tank. In this manner, the portion of the conduit above the vertical height defines an airlift tube.

In an embodiment of the invention, the filter bed comprises an open cell reticulated foam plastic material such as a layer of polyurethane foam. Furthermore, a layer of activated carbon is disposed in the filter chamber.

The aforementioned objects, features and advantages of the present invention will, in part, be pointed out with particularity, and will, in part, become obvious from the following description of the invention, taken in conjunction with the accompanying drawings, which form an integral part thereof.

BRIEF DESCRIPTION OF THE DRAWINGS

In the drawings:

FIG. 3 is a side sectional view taken along lines 3—3 of FIG. 2;

FIG. 4 is an end sectional view taken along lines 4—4 of FIG. 2;

FIG. 5 is a partially broken away sectional view of the inlet to the filter housing, and taken along line 5—5 of FIG. 2;

In the various drawings, like reference characters designate like parts.

DETAILED DESCRIPTION OF THE PREFERRED EMBODIMENTS

Figures 1, 2, 6, 7:
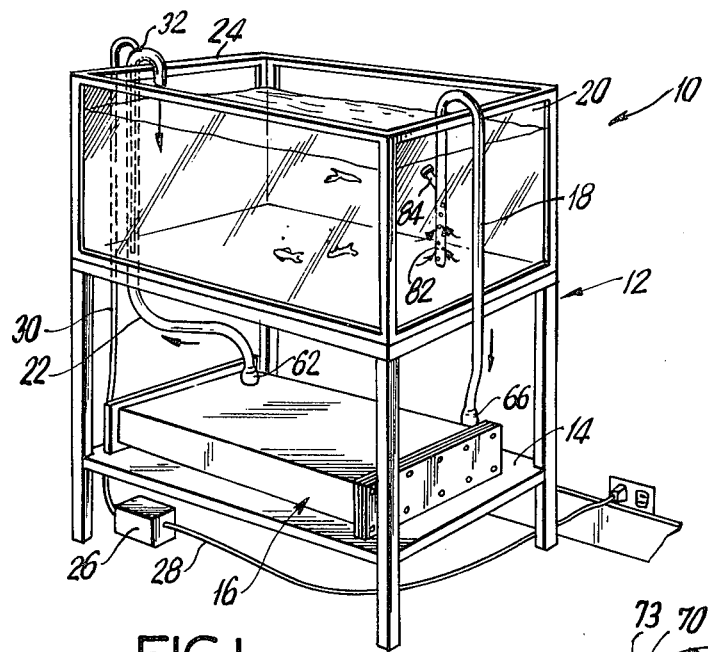
FIG. 1 is a perspective view of an aquarium tank utilizing the improved aquarium filter of the present invention.
FIG. 2 is a perspective view of the aquarium filter housing.
FIG. 6 is a side sectional view of a portion of the output means useful in illustrating the airlift water action in accordance with the present invention.
FIG. 7 is a side sectional view of a portion of the siphon tube illustrating an openable port for introducing the activated carbon in the system in accordance with the present invention.

Referring now to the drawings, there is shown an aquarium tank 10 supported on a table 12 having a lower shelf or platform 14. Placed on the lower shelf 14 is the housing 16 of the filter assembly of the present invention. The filter housing 16 is in communication with the aquarium tank by means of an inlet tube 18 which extends over the edge of one end wall 20 of the aquarium tank and an outlet conduit 22 which passes upwardly and extends over the edge of an opposing end wall 24 of the aquarium tank. A commercially available air pump 26, well known in the art, is provided and is electrically connected to a conventional source of electric power by means of the electric wires 28. The compressed air at the output of the air pump 26 passes through a conveying tube 30 and into the outlet conduit 22, proximate its upper end at a point 32.

With reference to FIGS. 2-4, the housing 16 is formed as an elongated container having a substantially rectangular cross sectional configuration and including a top wall 34, an opposing bottom wall 36, opposing side walls 38, 40 and opposing end walls 42, 44. Both end walls 42, 44 are enlarged as compared to the cross sectional configuration of the container, so as to extend downwardly from the bottom wall 36 to thereby provide feet for supporting the container.

The housing 16 is completely closed, with at least one wall made removable so as to permit entry into the housing. Specifically, the end wall or plate 44 is made removable in this embodiment. An outwardly extending peripheral flange 46 is provided at one end of the housing. The end wall 44 is connected to the peripheral flange by means of a series of nuts and bolts 48 which pass through the end wall 44 and the flange 46. A peripheral gasket 50 is included for insuring the integrity of the enclosure and preventing leakage between the removable end wall 44 and the flange 46. It is understood, that other parts of the housing 16 could be made removable so as to permit entry into the housing.

Located within the housing are a plurality of elongated ribs 52 downwardly extending from the top wall 34. A corresponding set of ribs 54 upwardly extend from the bottom wall 36 in spaced apart relationship with the upper ribs 52 so as to define therebetween a channel space 56 into which the filter bed can be inserted. The ribs 52, 54 are located in a longitudinal uniform array as can best be seen in FIG. 2.

The filter bed is formed of a layer of material 58 which is fabricated from an open cell reticulated foam plastic material. By way of example, a polyurethane foam can be utilized for the filter bed. Such foam, as the Scott Industrial Foam or the Scott Filter Foam, is available from the Foam Division of the Scott Paper Company, Chester, Pa. The polyurethane foam, having a surface area many times larger than a comparable layer of gravel, can support an infinitely larger population of bacteria of the genera Nitrosomonas and Nitrobacter, which are the nitrifying bacteria responsible for the oxydation of ammonia to nitrite and of nitrite to nitrate. Thus, the foam provides the effect of a biological filter.

By utilizing the polyurethane foam as a filter bed, the benefits of a biological filter are obtained without the detriments of an undergravel type filter. Furthermore, additional benefits are obtained, which include the fact that the uniformity of the pores in the foam will prevent channeling, thereby allowing an even flow of the water through the entire filter bed at all times.

The filter bed can be inserted or replaced by removing the nuts and bolts 48 holding the end wall 44 on the flange 46 to thereby gain access to the channel 56 for insertion or removal of the filter bed, as can best be seen in FIG. 3.

Located above the filter bed, and specifically in the area defined between the channel 56 and the top wall 34, is an upper chamber 60, defined as the clean water chamber. The clean water chamber supplies clean water to the aquarium tank by means of an outlet port 62. The outlet port is formed in the top wall 34 of the housing 16 and is in communication flow with the clean water chamber 60. Beneath the filter bed, and specifically in the area between the channel 56 and the bottom wall 36, is the chamber 64 defined as the filter chamber. The filter chamber receives the contaminated aquarium water therein by means of the inlet port 66 having an extension arm 68. The contaminated water passes through the extension arm 68 and then through the side wall 38 of the housing so as to be in fluid flow communication with the filter chamber 64, as best shown in FIG. 5.

In operation, the housing 66 of the filter assembly is placed under the aquarium tank, preferably on the platform 14 beneath the tank 10. The inlet port 66 is connected to the inlet tube 18 with the upper end of the inlet tube overhanging the aquarium tank and inserted into the aquarium water, so that the inlet tube 18 can function as a siphon tube. The outlet port 62 is connected to the conduit 22 which also passes upward and overhangs the edge of the aquarium tank. The end of the conduit 22 is preferably shown placed above the water level in the aquarium tank so as to permit visual verification of continuous flow of the water from the filter. However, it is understood that this end could be placed directly into the aquarium water.

As is best seen in FIG. 6, the conveying tube 30 from the output of the air pump 26 is fed directly into the outlet conduit 22. More specifically, an opening 70 is formed in the outlet conduit 22 upstream from the neck portion 72 which overhangs the edge of the aquarium tank. A plug or ring 73 holds the conveying tube 30 in the conduit opening 70. The conveying tube 30 is fed downwardly into the conduit 22 with the lower end 74 of the conveying tube 30 terminating at a point along the vertical height of the outlet conduit 22. Compressed air from the air pump passes in the direction of the arrows 76, up through the conveying tube 30 and then downward through the end 74 of the conveying tube. The air will then flow upwardly through the outlet conduit 22 as shown by the arrows 78. The air bubbles upward will carry with it the clean water contained in the outlet conduit 22 to thereby airlift the water through the neck portion 72 so that it will exit, as shown by the arrow 80, from the outlet end of the conduit tube 22 into the aquarium tank.

In operation, the filter is started by placing the siphon or inlet tube 18 into the aquarium water and starting the siphon to cause water to flow through the filter. The siphon can be started by creating a vacuum therein, in any known manner. For example, a vacuum pump could be attached to the end of the outlet conduit 22 causing a vacuum within the siphon, or alternately, by using one's mouth on the end of the outlet conduit 22 to draw the aquarium water through the siphon tube in the conventional manner. Once the siphon is started, the aquarium water contained within the siphon will flow downwardly to the filter housing positioned beneath the aquarium tank. In this way, water from the aquarium tank will continuously flow into the filter, in the manner set forth below.

By means of standard siphoning principals, once the siphon is started, water from the aquarium tank will continuously flow into the siphon tube 18, then through the filter housing, and finally upward through the outlet conduit 22 until it reaches a height in the conduit 22 which is proximate the water level in the aquarium tank. However, by means of the compressed air passing into the outlet conduit 22, the clean water in the outlet conduit is airlifted the rest of the height so as to bring the clean water above the water level in the aquarium tank and over the upper edge of the aquarium tank whereby it will exit and deposit into the aquarium tank.

Accordingly, with the aid of the airlift action, a circulatory flow is established whereby contaminated aquarium water will enter the external biological aquarium filter by means of the siphon tube and will return back as clean water to the aquarium tank through the outlet conduit 22. The return flow is achieved by means of the combination of the siphoning action, which brings the cleaned water up to the specified height of the water level in the aquarium tank, and the airlift action of the compressed air, which lifts it over the upper edge of the aquarium tank.

Within the external biological aquarium filter, the contaminated water enters the inlet port 66 which brings the water into the lower filter chamber of the housing beneath the filter bed. The flow of water will then be upward through the filter bed, as can best be seen in FIG. 3. The water will then enter the clean water chamber above the filter bed and exit through the outlet port 62 to return back to the aquarium tank.

It is therefore noted, that the filtering is from the bottom upwards through the filter bed. The lower filter chamber will therefore also act as a settling chamber where the larger particles of detritus and food can settle. As a result, dirt particle will not clog the pores of the foam and will not impair the functioning of the filter bed. On the other hand, the solid particles will fall against the bottom wall 36 of the filter leaving the face of the filter bed free for the flowing water. Nevertheless, although the larger solid particles accumulate along the bottom wall 36, the constant water flow over the sediment will help prevent the sediment from becoming foul.

Since large particles of debris cannot clog the filter bed, a very fine foam can be used which would increase the surface area for bacterial attachment and therefore increase the carrying capacity of the filter bed immensely. This lack of accumulation of debris along the surface and within the pores of the foam permits a great improvement over prior art aquarium filters.

A further benefit of the upward flow is that the accumulated sediment can easily be backflushed without disturbing the filter bed. When it is desired to clean the filter, it is not necessary to remove the filter bed at all. The sediment collected in the settling chamber against the bottom wall 36 can be cleaned out by means of the back flow which will wash out the sediment.

FIG. 7 shows an enlarged cross sectional view of the end portion 82 of the siphon tube 18 which is inserted into the aquarium water. The end portion 82 includes an auxiliary inlet port 84. A removable plug or cap 86 closes the inlet port 84. Preferably, the plug 86 is fabricated from a plastic material, and is force-fitted into the inlet port 84. It is understood, that the plug 86 can be removably secured in the inlet port 84 by any suitable connecting means, such as by a threaded engagement therebetween.

The inlet port or opening 84 is used to introduce fine grained or pulverized activated carbon into the filter assembly. Accordingly, when the hobbyist determines that the condition of the aquarium water requires the use of activated carbon, the plug 86 is removed from the inlet port 84, and the activated carbon is introduced therein. Preferably, the hobbyist uses a conventional squeeze-type bottle (not shown) containing the activated carbon in a liquid suspension. The opening in the squeeze-type bottle is placed in alignment against the inlet port 84 which is below the aquarium water level, so that as the bottle is squeezed, the activated carbon from the bottle enters into the inlet tube 18 and is carried by the siphon action into the filter chamber 64 of the housing 16 to form a layer of activated carbon therein. Preferably, the layer of activated carbon in the filter chamber is in a liquid suspension. Due to the movement of the water within the filter chamber, the layer of activated carbon is disposed as close as possible to the filter bed 58, which obtains the best results.

It is therefore evident that with the unique arrangement of the present invention, the detriments of the undergravel filter are removed and nevertheless a biological filter can be achieved when using the reticulated foam plastic material. Furthermore, even the detriments of external filters are also eliminated, and additional benefits are achieved not heretofore obtainable with prior art aquarium filters.

The filter housing itself can be made of plastic material and can be molded with the ribs integrally formed therein. The size of the filter housing can be made larger than the bottom dimensions of the aquarium tank in order to increase the carrying capacity. When backwashing the filter, the filter bed can be maintained directly within the filter and the capacity for biological filtration can be maintained. Specifically by using cold to tepid water, backflushing will not kill the aerobic bacteria thereby preserving the biological activity of the filter bed.

Numerous alterations of the structure herein disclosed will suggest themselves to those skilled in the art. However, it is to be understood that the present disclosure relates to a preferred embodiment of the invention which is for purposes of illustration only and is not to be construed as a limitation of the invention.

What is claimed is:

1. An aquarium filter assembly for installation externally of an aquarium tank, comprising:

a filter receptacle;

separation means within said receptacle for providing in said receptacle a filter chamber beneath said separation means and a clean water chamber above said separation means;

said chambers being in fluid flow communication from said filter chamber up through said separation means to said clean water chamber;

an inlet port provided in said receptacle in communication with said filter chamber;

siphon tube means coupled to said inlet port for a siphon flow of contaminated water from the aquarium tank to said filter chamber;

conduit means in communication with said clean water chamber for supplying clean water from said clean water chamber to the aquarium tank;

said separation means including a filtering foam material;

support means disposed in said receptacle for supporting said filtering material;

said receptacle including an elongated closed container;

an outlet port provided in said receptacle in communication with said clean water chamber, said conduit means being coupled to said outlet port;

said closed container including a top wall, a bottom wall, side walls, and end walls;

said inlet port being disposed adjacent to one of said end walls and said outlet port being disposed adjacent to the other end wall;

said support means including a first set of elongated ribs extending downwardly from said top wall to provide first elongated rib edges spaced from said bottom wall, and a second set of elongated ribs extending upwardly from said bottom wall to provide second elongated rib edges spaced from said top wall;

said first elongated rib edges being spaced from said second elongated rib edges to define therebetween a channel through said receptacle for receiving therein said filtering foam material;

said first and second elongated rib edges engaging said filtering foam material to retain said filtering foam material in said channel; and a space between said channel and said top wall defining said clean water chamber, and an opposing space between said channel and said bottom wall defining said filter chamber.

2. An aquarium filter assembly as in claim 1, wherein said filtering foam material comprises at least a layer of open cell reticulated foam plastic material.

3. An aquarium filter assembly as in claim 1, wherein said filtering foam material comprises at least a layer of polyurethane foam.

4. An aquarium filter assembly as in claim 1, wherein a portion of said conduit means is adapted to receive compressed air and defines an air lift tube.

5. An aquarium filter assembly as in claim 1, wherein said receptacle is adapted for positioning beneath the aquarium tank, said siphon means including an inlet tube for upward extension from said inlet port of the receptacle and for insertion into the aquarium water, said inlet tube being adapted for overhanging a wall of the aquarium tank, said conduit means including an outlet tube for upward extension from said clean water chamber and for insertion into the aquarium tank, said outlet tube being adapted for overhanging a wall of the aquarium tank, and a conveying tube extending into said outlet tube for supplying compressed air, an output end of said conveying tube extending downward into said outlet tube to a vertical height lower than the water level in the aquarium tank.

6. An aquarium filter assembly as in claim 5, wherein said outlet tube includes a neck portion for overhanging a wall of the aquarium tank, and an aperture in said outlet tube upstream of said neck portion for receiving said conveying tube.

7. An aquarium filter assembly as in claim 1, and further comprising an outwardly extending peripheral flange at one end of said container, and a plate removably coupled to said flange for entry into said container.

8. An aquarium filter assembly as in claim 1, wherein said siphon tube means includes a closeable port for receiving activated carbon into said filter assembly where said activated carbon forms a layer in said filter chamber, and a removable plug for closing said port of said siphon tube means.

9. An aquarium filter assembly as in claim 1, wherein said closed container includes openable means for entry into said receptacle for insertion and removal of said filtering foam material.

* * * * *